United States Patent
Davis

(10) Patent No.: US 7,177,981 B2
(45) Date of Patent: Feb. 13, 2007

(54) METHOD AND SYSTEM FOR CACHE POWER REDUCTION

(75) Inventor: Timothy D. Davis, Arlington, TX (US)

(73) Assignee: VIA-Cyrix, Inc., Fremont, CA (US)

( * ) Notice: Subject to any disclaimer, the term of this patent is extended or adjusted under 35 U.S.C. 154(b) by 234 days.

(21) Appl. No.: 10/434,617

(22) Filed: May 9, 2003

(65) Prior Publication Data

US 2004/0225839 A1    Nov. 11, 2004

(51) Int. Cl.
*G06F 12/00* (2006.01)

(52) U.S. Cl. ............... 711/119; 711/129; 711/170; 365/227

(58) Field of Classification Search ............. 711/119, 711/129, 126, 133, 170, 173; 365/227; 713/300, 713/320
See application file for complete search history.

(56) References Cited

U.S. PATENT DOCUMENTS

| | | | |
|---|---|---|---|
| 5,018,061 A * | 5/1991 | Kishigami et al. ........... 711/3 |
| 5,029,126 A * | 7/1991 | Yamaguchi ................. 365/49 |
| 5,430,683 A * | 7/1995 | Hardin et al. ............... 365/227 |
| 5,692,151 A | 11/1997 | Cheong et al. ............. 711/140 |
| 5,737,746 A * | 4/1998 | Hardin et al. .............. 711/118 |
| 6,317,351 B2 | 11/2001 | Choi et al. .................... 365/49 |
| 6,449,204 B1 * | 9/2002 | Arimoto et al. ............ 365/222 |
| 6,449,694 B1 | 9/2002 | Burgess, Jr. et al. ........ 711/128 |
| 6,453,390 B1 | 9/2002 | Aoki et al. ................. 711/140 |
| 6,680,875 B2 * | 1/2004 | Horiguchi et al. .......... 365/233 |
| 2002/0163847 A1 * | 11/2002 | Suyama et al. ............. 365/227 |
| 2004/0225839 A1 * | 11/2004 | Davis ......................... 711/118 |

* cited by examiner

*Primary Examiner*—Brian R. Peugh
(74) *Attorney, Agent, or Firm*—Preston Gates & Ellis LLP

(57) ABSTRACT

A method and system is disclosed for minimizing data array accesses during a read operation in a cache memory. The cache memory has one or more tag arrays and one or more data arrays. After accessing each tag array, a selected data array is identified, and subsequently activated. At least one predetermined data entry from the activated data array is accessed, wherein all other data arrays are deactivated during the read operation. In another example, the cache memory is divided into multiple sub-groups so that only a particular sub-group is involved in a memory read operation. By deactivating any many circuits as possible throughout the read operation, the power consumption of the cache memory is greatly reduced.

20 Claims, 5 Drawing Sheets

METHOD AND SYSTEM FOR CACHE POWER REDUCTION

BACKGROUND

The present invention relates generally to computers, and more specifically to reducing power consumption in a cache memory system.

A microprocessor can execute instructions at a very high rate, and it must be connected to a memory system. The memory system is ideally both large and fast, but it is practically impossible to design such a system. A composite memory system is designed such that it has both a small and fast cache memory and large but slow main memory components. For example, the access time of a cache may be around ten nanoseconds, while that of the main memory is around 100 nanoseconds.

A cache memory (or simply "cache")is a relatively small and fast storage system incorporated either inside or close to a processor or between a processor and a main system memory. A cache memory stores instructions or data, which can be quickly supplied to the processor. The effectiveness of the cache is largely determined by the spatial locality and temporal locality properties of the program involved. Data from the much larger but slower main memory is automatically staged into the cache by special hardware on demand, typically in units of transfer called "lines" (ranging, for example, from 32 to 256 bytes).

When a memory read operation is requested by the processor, the cache memory is checked to determine whether or not the data is present in the cache memory. If the cache contains the referenced data, the cache provides the data to the processor. Otherwise, the data is further accessed from the main memory. As such, the cache can store frequently accessed information and improves the processors performance by delivering the needed information faster than the main memory can. In a typical design, a cache memory uses data arrays to store data and tag arrays to store the tag addresses corresponding to the data.

A main memory address may consist of a tag field and an index field. The index field is used to index a specific tag address stored in a cache tag array. When a cache memory access is performed, the tag address stored in the cache tag array is read and it is then compared to the tag field of the main memory address. If the two tag addresses match, a cache "hit" has occurred and the corresponding data is read out from the cache to the processor. If the two tag addresses do not match, a cache "miss" has occurred and the requested data is not in the cache, and must be retrieved from other components such as the main memory. If a program running on the computer exhibits good locality of reference, most of the accesses by the processor are satisfied from the cache, and the average memory access time seen by the processor will be very close to that of the cache (e.g., on the order of one to two cycles). Only when the processor does not find the required data in the cache does it incur the "cache miss penalty", which is the longer latency to the main memory (e.g., on the order of twenty to forty cycles in computers with short cycle times).

Further, in the conventional art, there are multiple tag arrays and data arrays in the cache. They are usually accessed simultaneously so that it is optimal for the operation speed, although it is not the best consideration for the power consumption as all of the large data arrays must be read before the desired data is retrieved. This incurs a relatively large power consumption and is detrimental for low power applications.

What is needed is an improved method and system for selectively accessing the data arrays so that the total power consumption is reduced.

SUMMARY

A method and system is disclosed for minimizing data array accesses during a read operation in a cache memory. The cache memory has one or more tag arrays and one or more data arrays. After accessing each tag array, a selected data array is identified, and subsequently activated. At least one predetermined data entry from the activated data array is accessed, wherein all other data arrays are deactivated during the read operation.

In another example, the cache memory is divided into multiple sub-groups so that only a particular sub-group is involved in a memory read operation. The cache sub-groups are identifiable by different address ranges within the cache memory, each having a set of tag arrays correlated to a set of data arrays. There is a hit select module within each cache sub-group that is connected to the tag arrays and data arrays for activating a selected data array. Further, there may be an output select module within each cache sub-group that controls a delivery of one or more data entries in the selected data array. After a memory access request is received by the cache memory, only one sub-group is selected based on an address provided by the request, and only one data array is thereafter activated if a cache hit is found during the read operation.

By deactivating as many circuits as possible throughout the read operation, the power consumption of the cache memory is greatly reduced.

DESCRIPTION

The present disclosure provides an improved method for accessing only selective data arrays thereby minimizing the access only to the array in which the desired data is stored.

Figure 1:
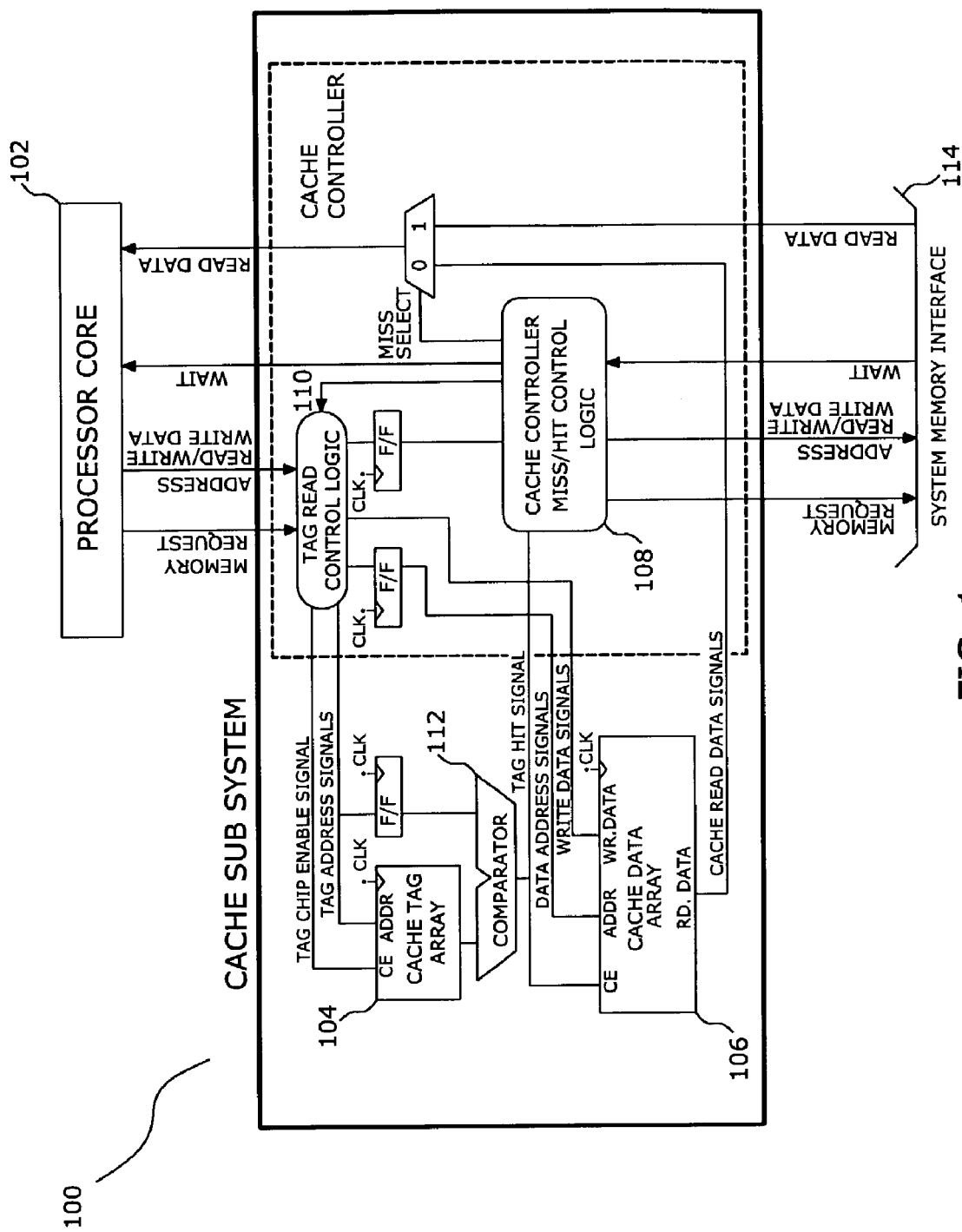
FIG. 1 illustrates a typical layout of a cache memory.

FIG. 1 is a schematic of a conventional cache memory sub-system (or "cache") 100 that works with a processor core 102. The cache has a cache tag array 104 and data array 106. Although only one tag array and one data array is shown, it is understood that multiple tag arrays and multiple data arrays can be implemented as the design requires. Other key components include a cache controller miss/hit control logic module 108 and a tag read control logic module 110. In a typical design, there is a comparator 112 that generates a signal indicating whether a hit has been detected. The cache controller miss/hit control logic module 108 and tag read control logic 110 interface with the processor 102 and system memory interface 114 to carry out all memory reading and writing operations. Some other standard components are shown in FIG. 1 but are not discussed in specific because they are all well known in the industry that help to complete the functionality of the cache memory sub-system.

Figure 2:
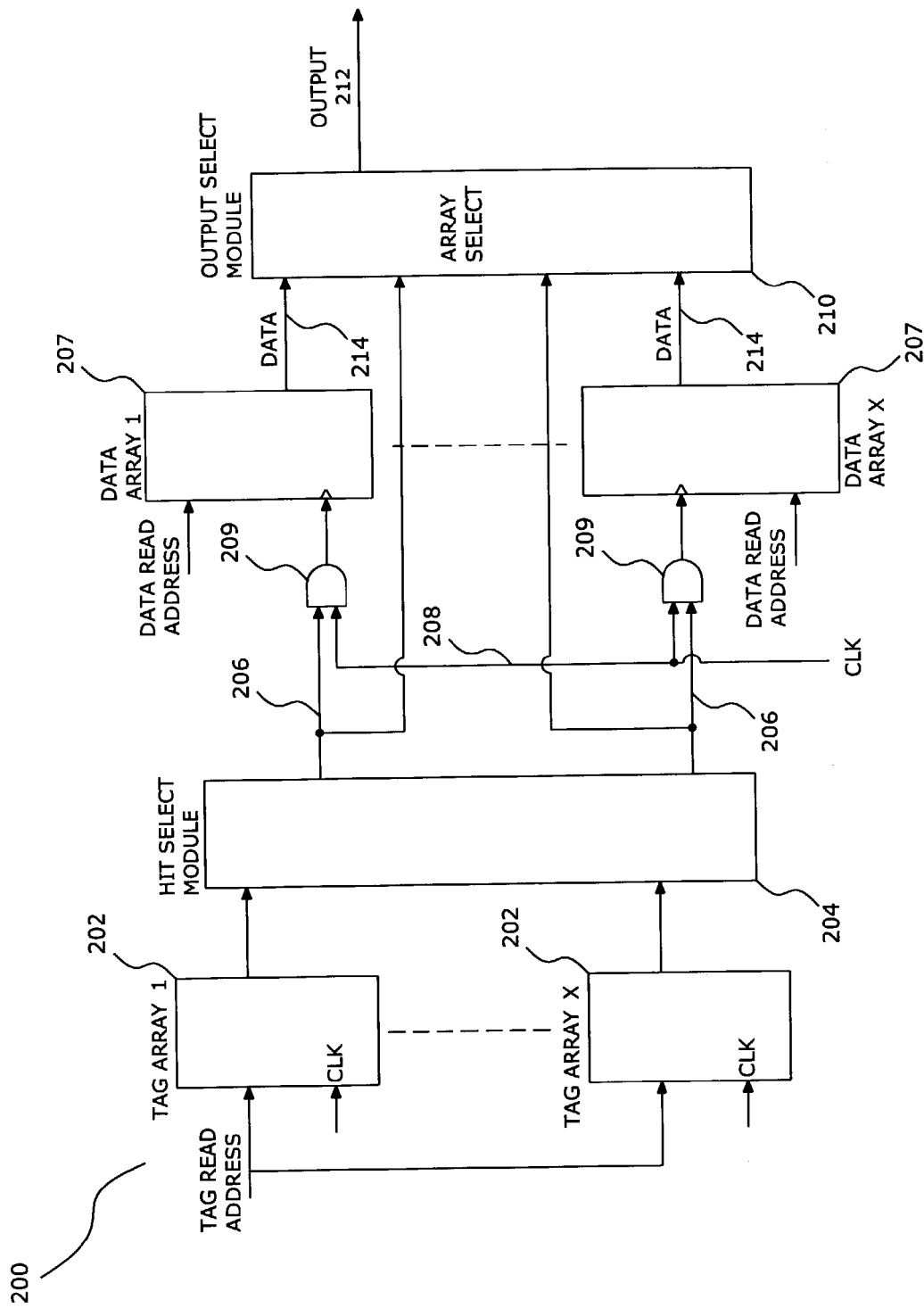
FIG. 2 is a block diagram for an improved cache memory according to one example of the present disclosure.

FIG. 2 illustrates an improved design of a portion of the cache memory 200 according to one example of the present disclosure. Assuming a memory access request is issued by the processor, and the tag read control logic module 110 provides a tag read address. Using an address contained within the memory access request, each tag array 202 is searched to see whether there is a hit or a miss. A hit select module 204 receives inputs from all the tag arrays and determines whether there is a hit in the cache. The hit select module 204 may include a comparator (as shown in FIG. 1) and other logic devices such as an "OR" gate, etc. In any event, only one input from the tag arrays is going to trigger an array select signal 206 for the data arrays 207. In order to control the timing, the array select signal 206 may be tied together with a clock signal 208 through an "AND" gate 209 prior to activating the selected data array. Although there may be multiple data arrays (as shown in FIG. 2), there will only be one data array that is going to be activated by using the array select signal. Although the array select signals are all labeled as 206, it is understood that there are multiple such signals with each one controlling one data array. After the data is read from the data array, it is fed into an output select module 210. The array select signals 206 associated with all the data arrays will also be fed into the output select module. The array select signals may be viewed as a bundle of enable signals, each of them enabling the data read from a data array 207 to be passed through as an output 212. It is the array select signal 206 that both enables the data array and selects which data line 214 reaches the output 212. As such, there is only one data line 214 feeding into the output select module that eventually makes the data become the output 212. One skilled in the art can appreciate that the output select module may be comprised of multiple lines of tri-state multiplexing circuits that are commonly found for selecting one output data 214 of the data array. As an alternative, in pre-charged circuits wherein the data output of a selected data array is held at a high voltage, while the data outputs of all other disabled data arrays are held at low (or "zero"), a simple "OR" gate can be used in the output select module to generate the final output 212. Further, the tag array and the data array can also be one-to-one correlated so that once a particular tag array is determined, the data entry that needs to be retrieved is "narrowed down" to be in one particular data array. For example, in a multi-way cache memory system, each tag array may represent one way such that only the data array associated with that way is activated if a hit is found therein.

Figure 3:
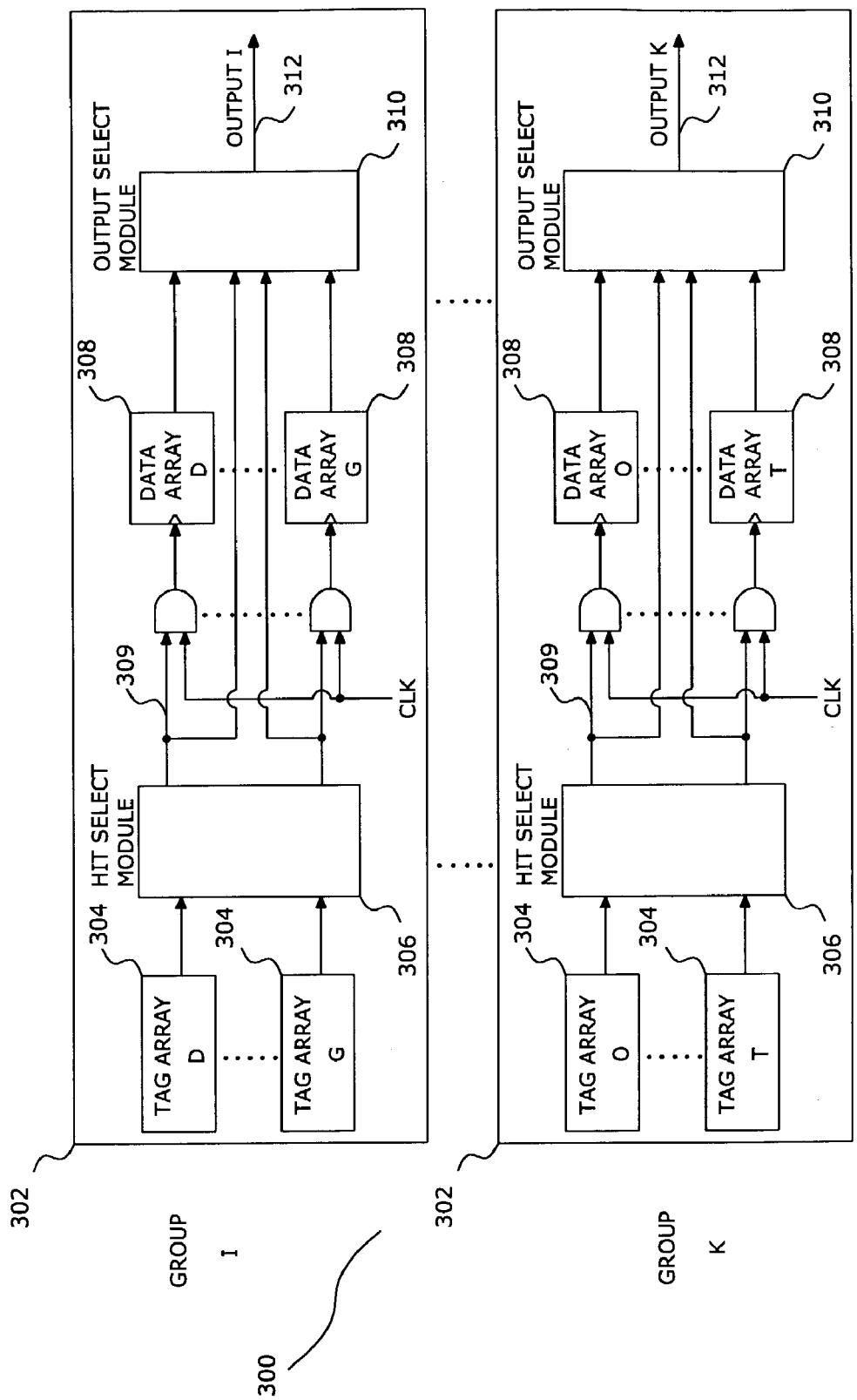
FIG. 3 is a block diagram for an improved cache memory according to another example of the present disclosure.

FIG. 3 illustrates a portion of a cache 300 according to another example of the present disclosure. In this example, the cache may be divided into multiple cache sub-groups 302 based on one or more predetermined address ranges. Each sub-group within the cache may have one or more tag arrays and one or more data arrays correlated based on a relatively small address range. Each sub-group can be separately located in a different physical location in a distributed manner, or they can also arranged in any contiguous way if necessary. Like a regular cache structure, each sub-group 302 may have a set of tag arrays 304 (a.k.a., multiple ways), which are connected to a hit select module 306. After receiving a cache access request indicating a memory address, based on the memory address, only one sub-group is accessed. The operation of the tag arrays and the hit select module 306 further determines whether one of the correlated data arrays 308 in the subgroup will be accessed. For instance, only one data array select signal 309 is generated to turn on a selected data array. Through an output select module 310, a final output 312 will be generated if a hit is found. Under such an arrangement, other cache sub-groups can be temporarily put on hold, and do not need to be accessed in order to search for a hit. Moreover, even within a sub-group, multiple data arrays will be spared from being searched since only one data array needs to be accessed because the search in the tag array has narrowed down the range of memory space to be searched based on the memory address provided by the access request. As such, the power consumption for a cache read operation can be greatly reduced.

Figure 4:
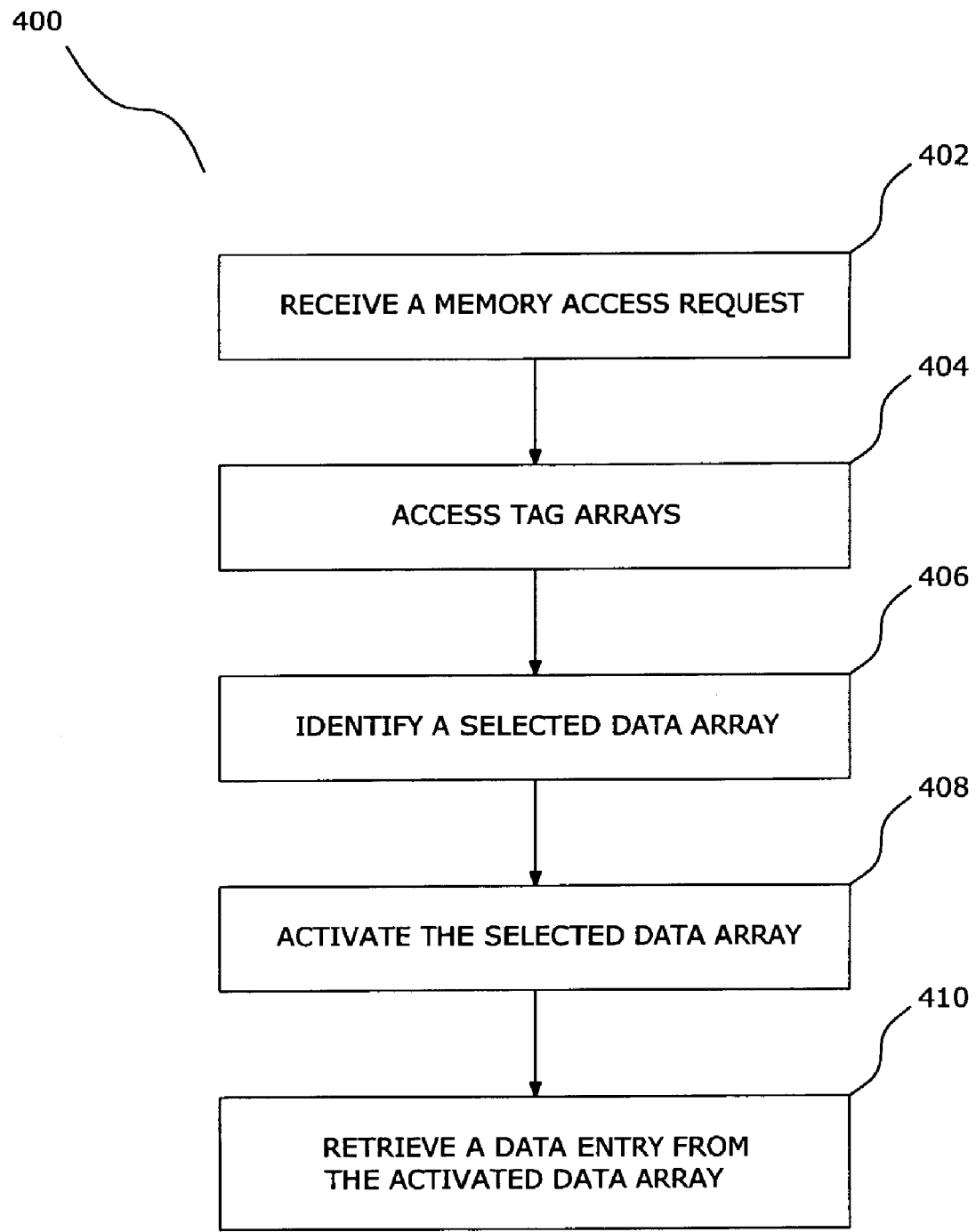
FIG. 4 is a flow diagram illustrating a process for retrieving data from a selected data array according to one example of the present disclosure.

FIG. 4 is a flow diagram 400 illustrating how to retrieve data from a selected data array according to one example of the present disclosure. After a memory access request is received in step 402, each tag array is accessed in step 404 to look for a selected data array. The tag array search identifies a particular data array wherein the desired data is located (step 406). After activating the selected data array in step 408, at least one predetermined data entry is retrieved from the activated data array in step 410, wherein all other data arrays are deactivated during the entire read operation.

Figure 5:
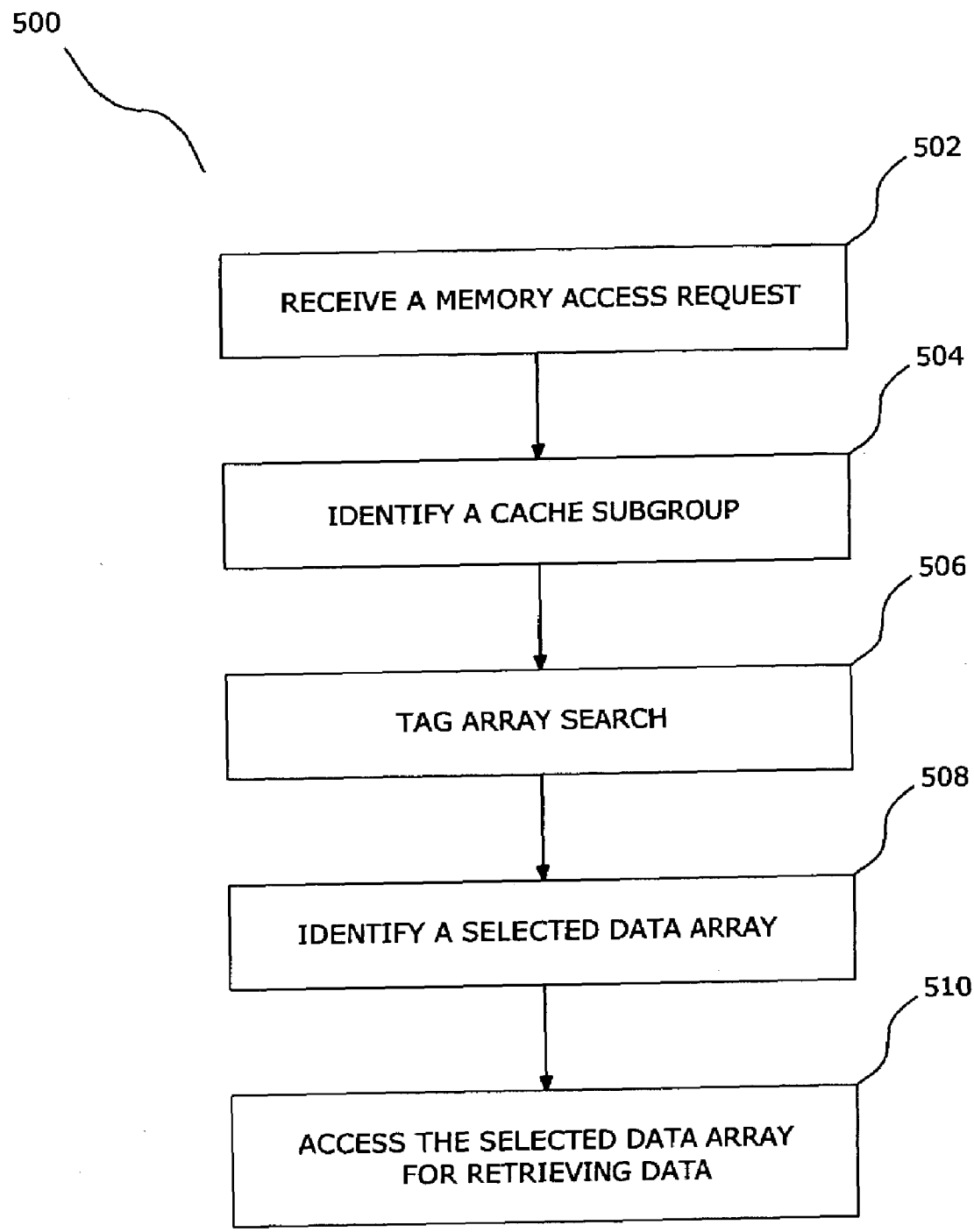
FIG. 5 is another flow diagram illustrating a process for retrieving data from a selected data array in a sub-group of the cache according to one example of the present disclosure.

FIG. 5 is another flow diagram 500 illustrating how to retrieve data from a selected data array according to another example of the present disclosure. The cache is divided into sub-groups as described above. After a memory access request is received in step 502, a cache sub-group is first identified for search in step 504. After each tag array in the sub-group is accessed in step 506, a selected data array is identified, in which the desired data is located (step 508). After activating the selected data array, at least one predetermined data entry is retrieved from the activated data array in step 510, wherein all other data arrays are deactivated during the entire read operation.

It is further noticed that if a cache miss occurs, that is, when the tag arrays are accessed but no address match is found, there will be no hit select signal being generated, and therefore, no data array is further needed. As such, all the data arrays and their output select circuits can be put in an inactive mode.

The above disclosure provides several different embodiments, or examples, for implementing different features of the disclosure. Also, specific examples of components, and processes are described to help clarify the disclosure. These are, of course, merely examples and are not intended to limit the disclosure from that described in the claims.

While the disclosure has been particularly shown and described with reference to the preferred embodiment thereof, it will be understood by those skilled in the art that various changes in form and detail may be made therein without departing from the spirit and scope of the disclosure.

What is claimed is:

1. A method for minimizing data array accesses during a read operation in a cache memory, the cache memory having one or more tag arrays and one or more data arrays, the method comprising:

generating one or more cache sub-groups by dividing the cache memory, each sub-group having one or more tag arrays and one or more data arrays;

accessing each tag array in a selected sub-group of the cache memory to identify a selected data array;

activating the selected data array; and retrieving at least one predetermined data entry from the activated data array, wherein all other unselected data arrays within the selected sub-group and all other unselected sub-groups of the cache memory are deactivated during the read operation.

2. The method of claim 1 wherein activating further includes utilizing a data array hit select module to generate only one data array select signal.

3. The method of claim 2 wherein the data array select signal is synchronized with a clock signal.

4. The method of claim 1 further comprising generating an output signal from the activated data array after retrieving the data entry.

5. The method of claim 4 wherein the data arrays are pre-charged circuits.

6. The method of claim 1 wherein the data arrays and the tag arrays of the cache memory are one-to-one correlated.

7. The method of claim 1 wherein the accessing further includes utilizing a memory address indicated by a memory access request.

8. A method for minimizing data array accesses during a read operation in a cache memory. the cache memory having one or more tag arrays and one or more data arrays, the method comprising:
   generating one or more cache sub-groups by dividing the cache memory based on one or more predetermined address ranges, each sub-group having one or more tag arrays and one or more data arrays;
   receiving a memory access request indicating a memory address;
   identifying a selected cache sub-group for accessing same based on the memory address;
   accessing each tag array within the selected sub-group to identify a selected tag array in which a cache hit is found;
   identifying a selected data array correlated to the selected tag array within the selected sub-group; and
   accessing the selected data array for retrieving predetermined data entry according to the memory access request,
   wherein all other unselected data arrays within the selected sub-group and all other unselected sub-groups of the cache memory are deactivated during the read operation.

9. The method of claim 8 wherein the correlation between the tag array and the data array is one-to-one.

10. The method of claim 8 wherein the accessing the selected data array further includes utilizing a hit select module to generate only one data array enabling signal.

11. The method of claim 8 wherein the accessing further includes activating an output associated with the selected data array.

12. The method of claim 8 wherein the data arrays are pre-charged circuits.

13. A cache memory for minimizing data array accesses during a read operation, the cache memory comprising:
   one or more tag arrays;
   a hit select module connected to the tag arrays for activating a selected data array using an array select signal after a memory access request is received and processed; and
   one or more data arrays associated with the hit select module,
   wherein only the selected data array is activated by the array select signal during the read operation while other data arrays are deactivated,
   wherein the array select signal further activates an output logic that only allows a data entry retrieved from the selected data array to pass as an output.

14. The cache memory of claim 13 wherein the array select signal is synchronized with a clock signal.

15. The cache memory of claim 13 further comprises an output select module that includes one or more tri-state multiplexing circuits.

16. The cache memory of claim 13 wherein the data arrays are pre-charged circuits.

17. A cache memory for minimizing data array accesses during a read operation, the cache memory comprising:
   one or more cache sub-groups identifiable by different address ranges within the cache memory, each having a set of tag arrays correlated to a set of data arrays;
   a hit select module within each cache sub-group that is connected to the tag arrays and data arrays for activating a selected data array using an array select signal; and
   at least one output select module within each cache sub-group that controls a delivery of one or more data entries in the selected data array,
   wherein after a memory access request is received, only one sub-group is selected and only one data array is activated by the array select signal if a cache hit is found during the read operation.

18. The cache memory of claim 17 wherein the array select signal is synchronized with a clock signal.

19. The cache memory of claim 17 wherein the output select module includes one or more tri-state multiplexing circuits.

20. The cache memory of claim 17 wherein the data arrays are pre-charged circuits.

* * * * *